June 24, 1930.    S. W. VOLLINK    1,765,469
TRANSPLANTING MACHINE
Original Filed Feb. 27, 1928
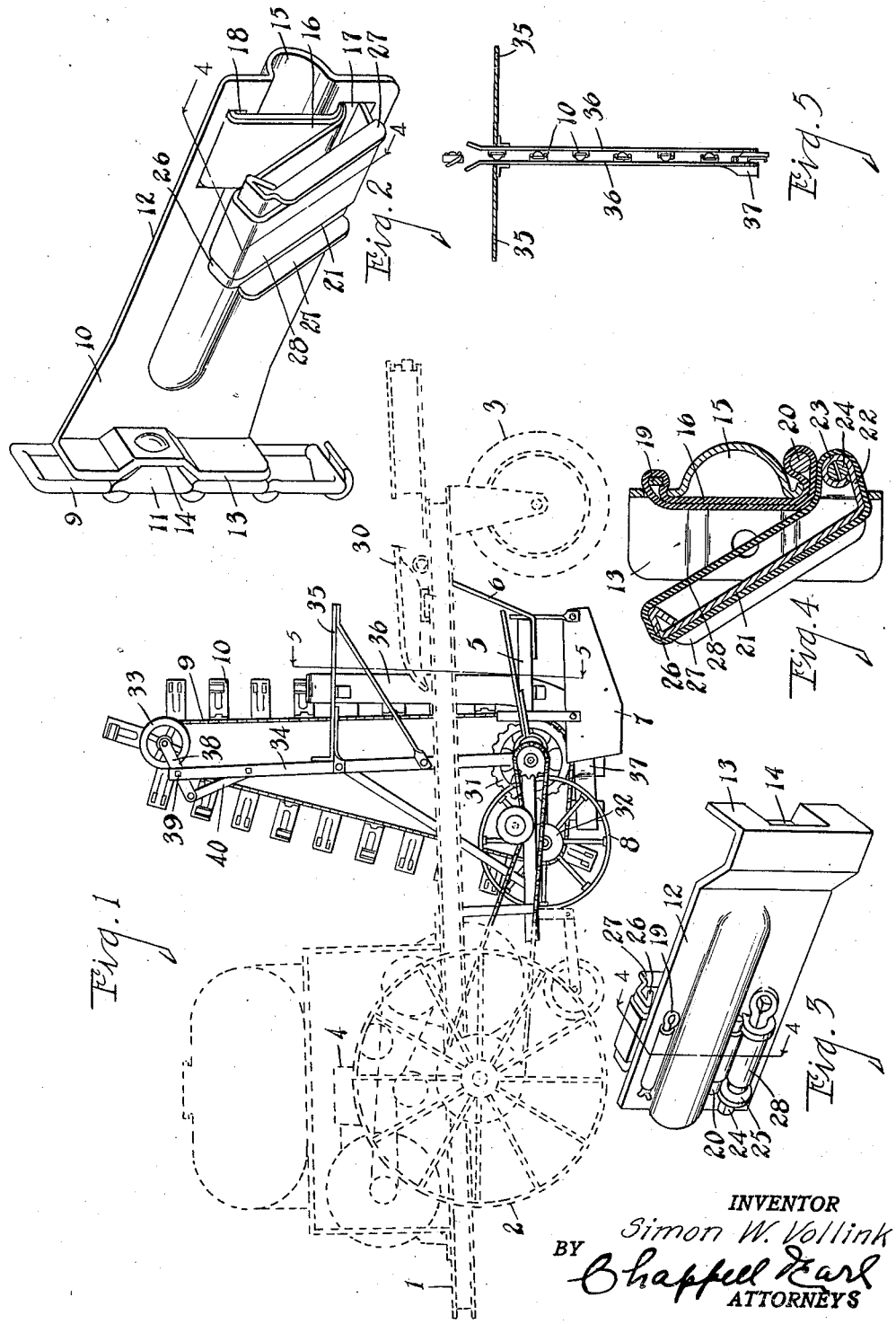
INVENTOR
Simon W. Vollink
BY Chappell Earl
ATTORNEYS Patented June 24, 1930

1,765,469

UNITED STATES PATENT OFFICE

SIMON W. VOLLINK, OF TECUMSEH, MICHIGAN

TRANSPLANTING MACHINE

Original application filed February 27, 1928, Serial No. 257,382. Divided and this application filed May 8, 1929. Serial No. 361,425.

This invention relates to improvements in transplanting machines of the type shown in my application for Letters Patent filed February 27, 1928, Serial No. 257,382, the present application being a division of said application.

The main objects of this invention are:

First, to provide a transplanting machine adapted for the transplanting of relatively small and delicate plants such as celery, beets, cabbage, tomato plants and the like which handles the plants without injury thereto.

Second, to provide a machine of this character which is of very large capacity.

Objects relating to details and economies of my invention will appear from the description to follow. The invention is defined and pointed out in the claims.

A structure which is a preferred embodiment of my invention is illustrated in the accompanying drawing, in which:

Fig. 1 is a side elevation of a structure embodying the features of my invention, portions not directly concerned with the subject matter of this application being shown by dotted lines.

Fig. 2 is a perspective view of a fragment of the conveyor, showing one of its plant holders.

Fig. 3 is a rear perspective view of one of the plant holders.

Fig. 4 is a sectional view on line 4—4 of Figs. 2 and 3.

Fig. 5 is a fragmentary view partially in vertical section on line 5—5 of Fig. 1.

In the drawing similar reference characters refer to similar parts throughout the several views.

Referring to the drawing, 1 represents the main carrying or running gear frame which is designed to support the operating parts. This frame is provided with carrying and driving wheels 2 and carrying and steering wheel 3. The engine designated generally by the numeral 4 is mounted above the carrying wheels 2. The driving connections thereto are not described.

The machine is provided with a sub-frame designated generally by the numeral 5 and is supported at its front end by the draw bars 6. On this sub-frame I mount a furrow opener 7 and at the rear of the furrow opener are press wheels 8. These parts are illustrated and described in detail in my said application.

The plants are delivered into the furrow formed by the furrow opener in proper relation to the press wheels by means of a conveyor consisting of a chain 9 carrying a plurality of holders designated generally by the numeral 10. These holders are mounted in spaced relation on the chain as may be desired according to the spacing of plants required.

The holders are carried by base members 11 designed to replace one of the links of the chain so that a different set-up or spacing is easily had.

The holders comprise body members 12 formed, in the embodiment illustrated, as sheet metal stampings and have flange-like base portions 13 at their inner ends recessed at 14 to receive the base member 11. The ends of these flanges overlap adjacent links as illustrated in Fig. 2 so that when the chain is taut the holders are supported substantially at right angles thereto.

The body members 12 have longitudinal channels 15 opening at the outer ends of the holders. Elastic gripping members 16 are disposed across these channels adjacent their outer ends. These gripping members are conveniently formed of elastic bands of proper width, the ends of which are disposed through holes 17 and 18 on opposite sides of the channel 15 and retained by the pins 19 and 20 which are disposed through the bights of the bands, as shown in Fig. 3.

The holders are provided with pivoted jaws 21, also preferably formed as sheet metal stampings and having rearwardly projecting flanges 22 at their inner ends disposed through the opening 17 and terminating in knuckles 23 engaged by the pivots 24 which are carried by ears 25 on the rear side of the body members of the holders. At their outer ends, the jaws 21 are provided with inwardly projecting flanges 26 and along their sides with out-turned flanges 27.

Resilient or elastic grippers 28 are arranged around the jaws and owing to their being arranged over the flanges at the ends of the jaws, are supported thereby, providing elastic gripping faces. These bands engage the inner edges of the holes 17 so that they act as springs for holding the jaws normally in open position. This arrangement provides an effective means for holding the plants without injury thereto, even very delicate seedlings such as beets and the like.

The conveyor is driven so that as the holders are carried along the operator occupying the seat 30 places the plants within the jaws which are automatically closed thereon and carried by the holders to the point of delivery.

In the embodiment illustrated, the driving and supporting means for the conveyor consists of a driven sprocket wheel 31, guide pulley 32 on the axle of the press wheels 8 and the guide pulley 33 carried by the upright 34 so that the downwardly moving reach of the conveyor is approximately vertical and in front of the occupant of the seat 30 and tables 35 are provided for the plants.

The holders are closed and retained in closed position by a pair of spaced closing and retaining members 36, the upper ends of which project above the tables and are flared, as shown in Fig. 5. The operator lays the plants, top inward, between the resilient grippers preferably retaining his grasp on the same until the holders are carried between the closing members, which closes the jaws, the flanges 27 thereof engaging one of the closing members and receiving the wear, the rib resulting from the forming of the channel 15 receiving the wear on the other side.

The retaining members are curved rearwardly and have horizontal portions 37 conformed so as to release the holders in proper relation to the press wheels so that the soil is pressed around the roots of the plants partially at least while they are still supported by the holders. The speed of the conveyor is the same as the speed of travel of the machine over the surface of the ground so that there is no distortion or tilting of the plants.

The pulley 33 is carried by an arm 38 pivoted at 39 and adjustably supported by the link 40 so that the pulley is adjustably supported.

My improved transplanting machine is especially designed for the handling of delicate plants but it is also desirable for use in planting roots, bulbs or tubers, or plants in which sections thereof are used in propagation.

I have illustrated and described my improvements in an embodiment which is of very large capacity and highly efficient. I have not attempted to illustrate or describe certain embodiments or adaptations which I contemplate as I believe the disclosure made will enable those skilled in the art to embody or adapt the same as may be desired.

Having thus described my invention, what I claim as new and desire to secure by Letters Patent, is:

1. In a structure of the class described, the combination of a conveyor provided with a plurality of holders, each comprising a body member having a longitudinal channel in its face and longitudinal openings at each side of said channel adjacent its outer end, an elastic band having its ends disposed through said openings and engaged by retaining pins disposed on the rear side of said body member providing a resilient gripper extending across said channel, a movable jaw having a rearwardly projecting flange at its inner end terminating in a pivot engaging knuckle, a coacting pivot mounted on the rear side of said body member, said jaw having an inwardly projecting flange at its outer end, an elastic band arranged longitudinally around said jaw between its said side flanges providing a yielding gripper and acting to yieldingly hold the jaw in its open position, the outer edge of the opening through which the jaw is arranged constituting a stop limiting the opening movement thereof, and spaced closing members disposed at the sides of the path of travel of said holders to close the jaws and retain them in closed position until the holders reach the point of delivery.

2. In a structure of the class described, the combination of a conveyor provided with a plurality of holders each comprising a body member having a longitudinal channel in its face and longitudinal openings at each side of said channel adjacent its outer end, an elastic band having its ends disposed through said openings and engaged by retaining pins disposed on the rear side of said body member providing a resilient gripper extending across said channel, a movable jaw having a rearwardly projecting flange at its inner end terminating in a pivot engaging knuckle, a coacting pivot mounted on the rear side of said body member, said jaw having an inwardly projecting flange at its outer end, an elastic band arranged longitudinally around said jaw between its said side flanges providing a yielding gripper and acting to yieldingly hold the jaw in its open position, and spaced closing members disposed at the sides of the path of travel of said holders to close the jaws and retain them in closed position until the holders reach the point of delivery.

3. In a structure of the class described, a holder comprising a body member having a longitudinal channel in its face and longitudinal openings at each side of said channel adjacent its outer end, an elastic band having its ends disposed through said openings and engaged by retaining pins disposed on the rear side of said body member providing a resilient gripper extending across said channel, a movable jaw having a rearwardly projecting flange at its inner end terminating in a pivot engaging knuckle, a coacting pivot mounted on the rear side of said body, said jaw having an inwardly projecting flange at its outer end, and an elastic band arranged longitudinally around said jaw between its said side flanges providing a yielding gripper and acting to yieldingly hold the jaw in its open position, the outer edge of the opening through which the jaw is arranged constituting a stop limiting the opening movement thereof.

4. In a structure of the class described, a holder comprising a body member having a longitudinal channel in its face and longitudinal openings at each side of said channel adjacent its outer end, an elastic band having its ends disposed through said openings and engaged by retaining pins disposed on the rear side of said body member providing a resilient gripper extending across said channel, a movable jaw having a rearwardly projecting flange at its inner end terminating in a pivot engaging knuckle, a coacting pivot mounted on the rear side of said body member, said jaw having an inwardly projecting flange at its outer end, and an elastic band arranged longitudinally around said jaw between its said side flanges providing a yielding gripper and acting to yieldingly hold the jaw in its open position.

5. In a structure of the class described, the combination of a conveyor provided with a plurality of holders each comprising a body member having a longitudinal channel in its face and longitudinal openings at each side of said channel adjacent its outer end, an elastic band having its ends disposed through said openings and engaged by retaining pins disposed on the rear side of said body member providing a resilient gripper extending across said channel, a movable jaw having a rearwardly projecting flange at its inner end terminating in a pivot engaging knuckle, a coacting pivot mounted on the rear side of said body member, said jaw having an inwardly projecting flange at its outer end, an elastic band arranged longitudinally around said jaw between its said side flanges providing a yielding gripper, and means for closing the jaws and retaining them in closed position during predetermined periods of travel.

6. In a structure of the class described, a holder comprising a body member having a longitudinal channel in its face and longitudinal openings at each side of said channel adjacent its outer end, an elastic band having its ends disposed through said openings and engaged by retaining pins disposed on the rear side of said body member providing a resilient gripper extending across said channel, a movable jaw having a rearwardly projecting flange at its inner end terminating in a pivot engaging knuckle, a coacting pivot mounted on the rear side of said body member, said jaw having an inwardly projecting flange at its outer end, and an elastic band arranged longitudinally around said jaw between its said side flanges providing a yielding gripper.

7. In a structure of the class described, a holder comprising a body member having a longitudinal channel in its face, an elastic gripper disposed transversely across said channel, a movable jaw having a rearwardly projecting flange at its inner end disposed through said body member at one side of said channel, a pivot engaging said flange, said jaw having an inwardly projecting flange at its outer end, and a yielding gripper extending between said flanges in opposed relation to said gripper on said body member and acting to yieldingly hold the jaw in its open position.

8. In a structure of the class described, the combination of a conveyor provided with a plurality of holders, each comprising a body member having a longitudinal channel in its face, a yielding gripper supported at its ends disposed transversely across said channel, a jaw pivotally mounted on said body member to swing transversely of said channel, and a resilient gripper on said jaw disposed in opposed relation to said gripper on said body member.

9. In a structure of the class described comprising a body member having a longitudinal channel in its face, a yielding gripper supported at its ends disposed transversely across said channel, a jaw pivotally mounted on said body member to swing transversely of said channel, and a resilient gripper on said jaw disposed in opposed relation to said gripper on said body member.

10. In a structure of the class described, the combination of a conveyor provided with a plurality of holders arranged with part of the holders facing in opposite directions and laterally of their path of travel, and each comprising a body members having a longitudinal channel in its face, an elastic gripper disposed across the channel adjacent its outer end, and a movable jaw pivotally mounted on said gripper to swing transversely thereof, said movable jaw being provided with an elastic gripper.

In witness whereof I have hereunto set my hand.

SIMON W. VOLLINK.